United States Patent
Lee

(10) Patent No.: US 8,325,980 B1
(45) Date of Patent: Dec. 4, 2012

(54) PROVIDING INDICATIONS OF OBJECT ATTRIBUTES

(75) Inventor: Woo Jae Lee, Manhattan, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1016 days.

(21) Appl. No.: 12/336,244

(22) Filed: Dec. 16, 2008

(51) Int. Cl.
*G06K 9/20* (2006.01)

(52) U.S. Cl. .............. 382/103; 382/291; 348/333.04

(58) Field of Classification Search .......... 382/103, 382/106, 286, 291; 348/333.02, 333.03, 348/333.04, 333.11, 333.12, 346, 348, 349
See application file for complete search history.

(56) References Cited

U.S. PATENT DOCUMENTS

| | | | |
|---|---|---|---|
| 7,317,485 B1 * | 1/2008 | Miyake et al. | 348/333.02 |
| 2003/0071908 A1 * | 4/2003 | Sannoh et al. | 348/345 |
| 2008/0007627 A1 * | 1/2008 | Huang | 348/211.9 |
| 2008/0158409 A1 * | 7/2008 | Gotanda | 348/348 |
| 2008/0239104 A1 * | 10/2008 | Koh | 348/240.99 |
| 2008/0278587 A1 * | 11/2008 | Izawa | 348/207.11 |
| 2009/0046197 A1 * | 2/2009 | Ishijima | 348/346 |

* cited by examiner

*Primary Examiner* — Andrew W Johns

(57) ABSTRACT

Systems, methods, and computer-readable media for providing indications of object attributes to users via image capturing devices are provided. In one embodiment, scene data associated with a detectable area is obtained. The scene data is utilized to identify an object attribute associated with a set of objects, such as faces, within the detectable area. An indication of the object attribute is provided via an image capturing device.

19 Claims, 11 Drawing Sheets

PROVIDING INDICATIONS OF OBJECT ATTRIBUTES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Accordingly, in one embodiment, an aspect of the present invention is directed to a method for providing indications of object attributes to users via image capturing devices. The method includes obtaining scene data associated with a detectable area. The scene data is utilized to identify an object attribute associated with a set of objects within the detectable area. An indication of the object attribute is provided via an image capturing device.

In another aspect, an embodiment of the invention is directed to one or more computer-readable media having computer-executable instructions embodied thereon that, when executed, perform a method for providing feedback to a user of an image capturing device. The method includes obtaining scene data that is associated with a capture area. The scene data is analyzed to determine a number of objects within the capture area. An indication of the number of objects within the capture are presented to the user via the image capturing device.

A further aspect of the invention is directed to one or more computer-readable media having computer-executable instructions embodied thereon that, when executed, perform a method for providing feedback to a user of an image capturing device. The method includes using distance scene data to determine objects intended to be captured in an image. The distance scene data includes distances from the image capturing device to objects within a detectable area corresponding with the image capturing device. It is identified that each of the objects intended to be captured are not entirely within a capture area. An indication is provided to the user. The indication provides an indication that at least one object intended to be captured is not entirely within the capture area.

BRIEF DESCRIPTION OF THE DRAWINGS

Illustrative embodiments of the present invention are described in detail below with reference to the attached drawing figures, and wherein.

DETAILED DESCRIPTION

Figure 1A:
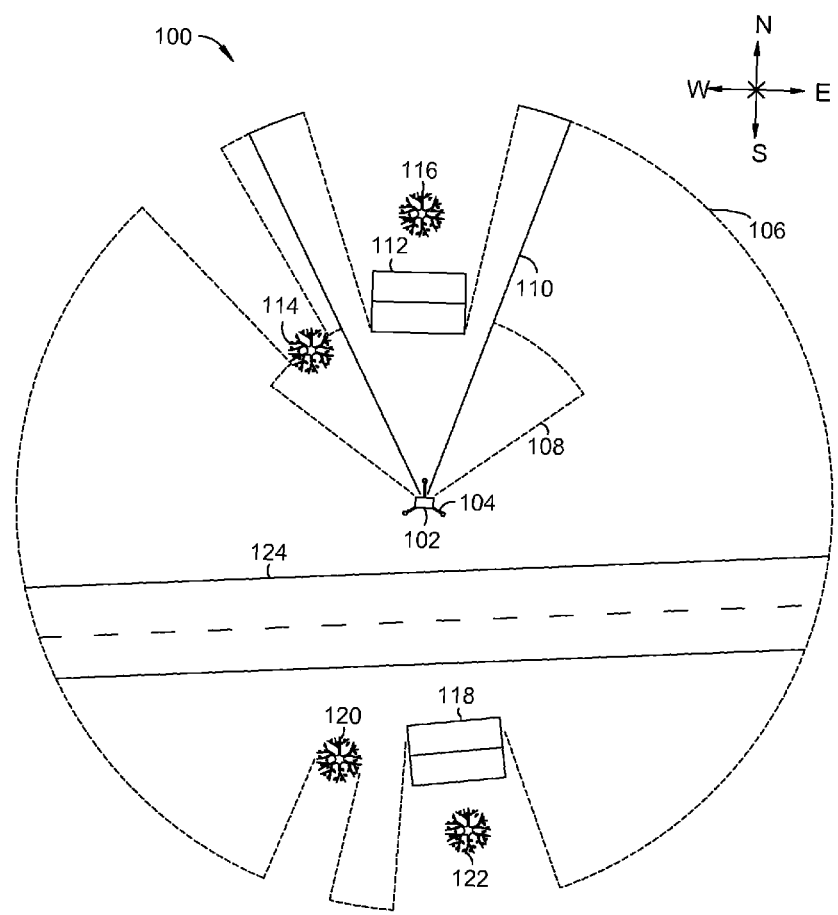
FIG. 1A is an overhead view of an exemplary environment in accordance with the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide indications of object attributes. An image capturing device, such as a camera, analyzes a detectable area associated with an image, such as an image to be captured. Based on the analysis of the detectable area, one or more object attributes that describe or characterize an object(s) within the detectable area are identified. In some cases, the object attributes might be identified utilizing object preferences that indicate, for example, a specific object or number of objects desired to be captured. Such object attributes might include, a number of objects within a capture area (e.g., 2 or 2.5), whether a particular object or specific number of objects is within a capture area, or the like. An indication of the object attributes identified are presented to a user, for example, using a light, an LCD display, an icon, a number, a vibration, an audible cue, a combination thereof, or the like. As such, a user can, for example, determine whether to continue with taking an image or modify the capture area prior to taking an image. In some cases, the capture area might be automatically modified in accordance with an object preference.

Having briefly described an overview of embodiments of the present invention, an exemplary environment in which embodiments of the present invention may be implemented is described below in order to provide a general context for various aspects of the present invention. Referring initially to FIG. 1 in particular, an exemplary environment for implementing embodiments of the present invention is shown and designated generally as environment 100. Environment 100 is but one example of a suitable environment and is not intended to suggest any limitation as to the scope of user or functionality of the invention.

Referring now to FIG. 1A, an environment 100 of an embodiment in accordance with the present invention is provided. It should be understood that this and other arrangements described herein are set forth only as examples. FIG. 1A illustrates an environment 100 in accordance with embodiments of the present invention. An image capturing device 102, such as a camera, is mounted to a tripod 104 and faces north. A viewable scene 106 exists from the vantage point of the tripod 104. Within the viewable scene is a building 112, a tree 114, a road 124, a building 118, and a tree 120. Tree 116 and tree 122 are not included within the viewable scene as trees 116 and 122 are obstructed from the potential view of the image capturing device 102, or user associated therewith, by buildings 112 and 118, respectively. Accordingly, a viewable scene includes any area and/or any object that can be viewed from a vantage point associated with an image capturing device, or user associated therewith. In this regard, a viewable scene contains objects that are capable of being viewed by an image capturing device, or user associated therewith, if rotated about one or more axes (e.g., an x-axis, a y-axis, and/or a z-axis).

The image capturing device 102, when facing north, corresponds with a detectable area 108. The detectable area 108 includes the building 112 and the tree 114. A detectable area refers to any area or a portion of a viewable scene about which information may be gathered by an image capture device. In this regard, a detectable area includes an area and/or any object that is detected by an image capturing device while the image capturing device is in a fixed position. Accordingly, a detectable area might include an area and all objects therein detectable by a distance detector and/or an area and all objects therein detectable through use of a camera lens at a particular time. That is, a detectable area might correspond with an area detected by one or more sensors (e.g., lens) of an image capturing device.

The image capturing device 102, when facing north, has a capture area 110. It should be noted that detectable area 108 includes capture area 110. The capture area 110 includes building 112. A capture area refers to an area, or a portion of a viewable scene or a detectable area, that is or might be, if selected, captured by an image capturing device. In embodiments, a capture area includes any objects that are captured or could be captured, if so desired, while the image capturing device is in a fixed position at a particular time. As such, a capture area might include an area, and all objects therein, that is captured or would be captured, if so desired (e.g., a user selects to record or capture an image), by an image capturing device. One skilled in the art will appreciate that, in some embodiments, an image capturing device only includes a detectable area or a capture area. That is, a detectable area and a capture area are the same. Accordingly, the image capturing device captures the area that it detects.

Figure 1B:
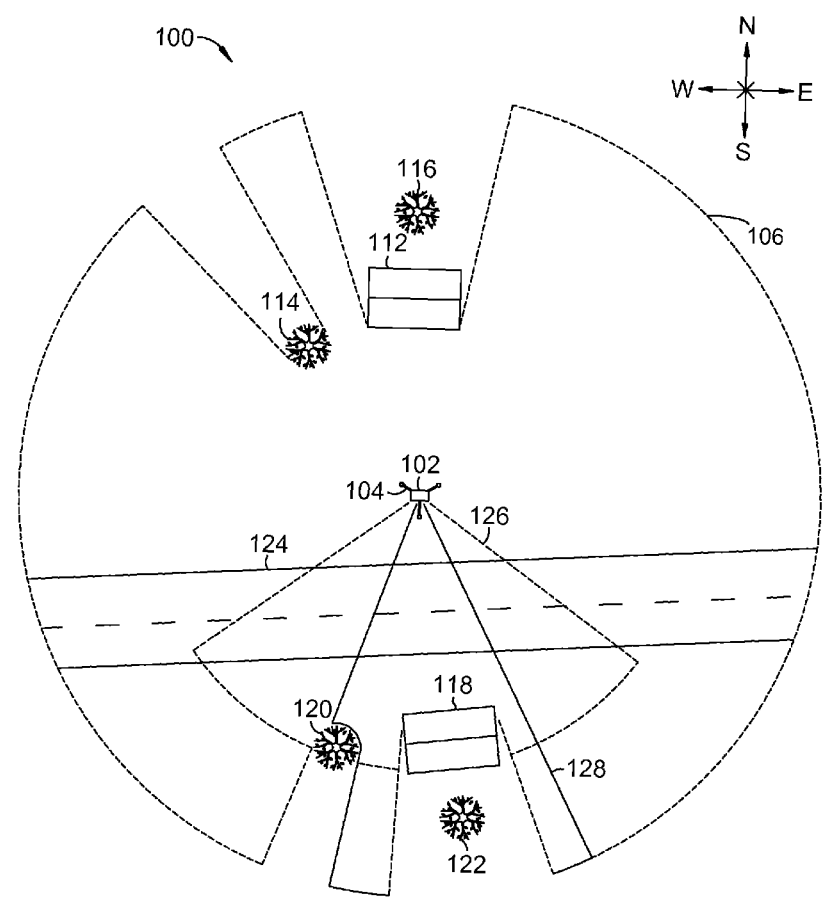
FIG. 1B is another overhead view of an exemplary environment in accordance with the present invention.

By way of illustration only, as illustrated in FIGS. 1A and 1B, building 118 and tree 120 are not within detectable area 108 or capture area 110 when the image capturing device 102 is directed towards the north, as shown in FIG. 1A. Assume that the image capturing device 102 is rotated so that it faces towards the south. In such a case, as illustrated by FIG. 1B, building 118 and tree 120 are within the detectable area 126 and the capture area 128.

Figure 2:
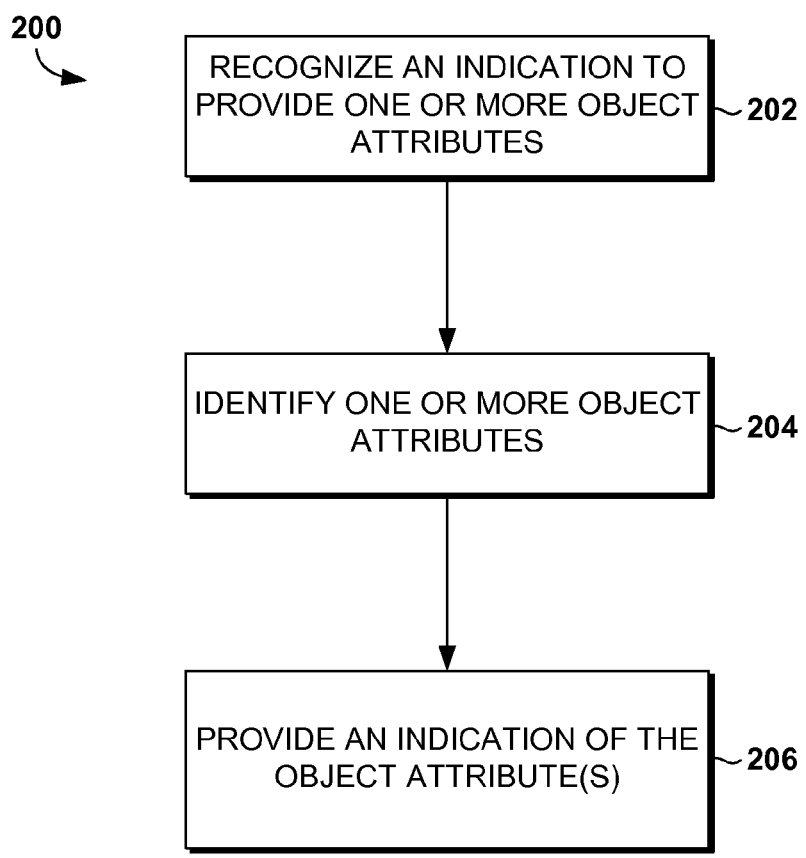
FIG. 2 is a flow diagram showing a method for providing indications of object attributes in accordance with an embodiment of the present invention.

Turning now to FIG. 2, an exemplary method for implementing embodiments of the present invention is shown and designated generally as method 200. A flow diagram is provided that illustrates a method for providing indications of object attributes. Method 200 is but one example of a suitable method and is not intended to suggest any limitation as to the scope of use or functionality of the invention. Various functions described herein as being performed by one or more entities may be carried out by hardware, firmware, and/or software. For instance, various functions may be carried out by a processor executing instructions stored in memory. In some embodiments, various functions may be implemented by components that are discrete or distributed components or in conjunction with other components, and in any suitable combination and location.

In embodiments, method 200 is performed in association with an image capturing device. That is, an image capturing device can perform various functions and embodiments of the method 200. An image capturing device, as used herein, refers to any electronic device that is capable of capturing an image. In embodiments, an image corresponds with a capture area, and objects positioned therein. An image might refer to a still image (e.g., a photograph), a moving image (e.g., a video or movie), or the like. By way of example only, and without limitation, an image capturing device can be a camera, a digital camera, a movie camera, a video camera, a mobile phone, a portable digital assistant (PDA), or any other device capable of capturing an image. In one embodiment, an image capturing device is a digital camera that is capable of capturing still photographs, or any other electronic device having such capabilities (e.g., a mobile phone).

With specific reference to FIG. 2, at block 202, an indication to provide one or more object attributes is recognized. Such an indication might be, for example, a request, a signal, or the like. An object refers to any type of object or item that is or can be captured in an image. An object might include, for example, a face, a person, a transportation item (e.g., a car, an airplane, etc.), a nature item (e.g., a flower, a tree, etc.), a building structure, a furniture item (e.g., a sofa, a table, etc.), or the like. An object attribute, as used herein, refers to any information or data that pertains to one or more objects associated with an image, or a corresponding capture area or detectable area. That is, an object attribute might describe or characterize one or more objects in association with an image, or a capture area or detectable area associated therewith. By way of example only, an object attribute might include a number of objects within an image, a number of objects excluded from an image, whether a specific object(s) is within an image, whether a specific number of objects is within an image, whether a particular object preference(s) is within an image, whether a type of object is in an image, combinations thereof, an indication thereof, or the like.

In one embodiment, an object attribute relates to one or more objects associated with an image that is currently being captured. In another embodiment, an object attribute relates to one or more objects associated with a recently captured image (e.g., the most recently captured image). Alternatively, an object attribute relates to one or more objects associated with a prospective image. A prospective image might refer to an image to be captured if selected (e.g., a user selects to record or capture an image). A prospective image might also refer to an image that could be captured upon a modification to a capture area parameter, as discussed more fully below.

An indication to provide one or more object attributes might be initiated by a user. A user can initiate an indication, for example, by selecting a button (e.g., a button specifically utilized to provide an indication or a button having other functions, such as capturing an image), using a touch screen, providing audio input, inputting, selecting, or submitting data (e.g., entering an object preference(s)), or providing a selection thereof, or the like. Alternatively or additionally, an indication to provide object attributes might be automatically initiated, for example, upon a lapse of a time or time duration, upon an event (e.g., powering on the image capturing device, focusing the image capturing device), etc.

One skilled in the art will appreciate that an indication to provide one or more object attributes might be initiated any number of times. For example, in one embodiment, an indication to provide object attributes is initiated and/or recognized each instance that object attributes are desired to be provided. In an alternative embodiment, an indication to provide object attributes is initiated and/or recognized via a single instance. In such a case, object attributes might be automatically presented to a user thereafter.

In embodiments, one or more object preferences are obtained. That is, object preferences might be received, retrieved, identified, determined, referenced, or the like. An object preference refers to data or information that indicates one or more object attributes desired or intended to be captured within an image. An object preference might be, for example, a number of objects to be captured within an image, a number of objects to be excluded from an image, a specific object (e.g., a face) to be captured within an image, a type of object to be captured within an image to capture, an object(s) having a particular size or distance (e.g., relative to one another, relative to the image capturing device, etc.) to be captured within an image, a color of an object(s) to be captured within an image, an attribute of an object(s) to be captured within an image, or any other characteristic or attribute of an object(s), scene, or image or capture area associated therewith. Such object preferences can be utilized by an image capturing device to identify one or more object attributes to provide to a user, as discussed more fully below.

In one embodiment, an object preference(s) is obtained upon an image capturing device recognizing an indication to provide object attributes. In this regard, upon recognizing an indication to provide an object attribute, a user interface can be presented via an image capturing device that enables a user to input or select one or more object preferences. By way of example only, a user might select a button to provide an indication that object attributes are desired to be presented or, alternatively, such an indication might be automatically provided. In response, the image capturing device might present a user interface such that the user can submit a set of one or more object preferences. In another embodiment, obtaining an object preference(s) provides an indication to provide object attributes. For instance, a user might enter or select object preferences via a user interface presented on an image capturing device and, accordingly, the image capturing device recognizes an indication to provide object attributes.

One skilled in the art will appreciate that one or more object preferences might be automatically obtained. That is, object preferences might be automatically determined by the image capturing device. For example, the image capturing device might analyze a viewable scene, a detectable area, or a capture area and determine objects, or attributes thereof, that might be desired or intended to be captured within an image. In embodiments, the image capturing device can make such a determination based on previously captured images, previously input object preferences, a distance to an object, a distance between objects, a color of an object, a motion of an object, or the like.

It can be appreciated that obtaining one or more object preferences can occur any number of times. For example, in one embodiment, object preferences are obtained each instance that object attributes are desired to be provided to a user. In an alternative embodiment, object preferences are obtained via a single instance or occasionally, such as, for example, at a time when a user establishes or modifies settings for an image capturing device.

At block 204, one or more object attributes are identified. Any number of object attributes can be identified. For example, in one embodiment, a single object attribute, such as a number of objects within a capture area, can be identified and provided to a user. In an alternative embodiment, multiple object attributes can be identified and provided to a user. Object attributes to be identified and/or presented to a user might be based on a default or established configuration, such as that established by a program administrator or developer, or based on a user indication of desired object attributes (e.g., a user selection of object attributes via a user interface provided on or remote from an image capturing device).

One skilled in the art will appreciate that object attributes can be identified using any method, algorithm, or lookup system. The process by which object attributes are identified might depend on an object attribute to be identified. In one embodiment, object attributes are identified using scene data. As such, scene data might be obtained (e.g., referenced, determined, received, retrieved, referenced, etc.) for use in identifying object attributes. Scene data refers to any data associated with a detectable area and may include data associated with a capture area and/or a viewable scene. Scene data might include, for example, distance scene data, visual scene data, infrared data, or the like. Distance scene data provides data associated with the distance of one or more objects. Such a distance might be a distance from an input capturing device to an object, the distance between objects, or the like. By way of example only, an image capturing device might determine a distance from the image capturing device to one or more objects. For instance, a distance from an image capturing device to an object at or near the center of a capture area might be determined or calculated. Based on the determined distance, the input capturing device can identify other similar objects at approximately the same distance from the input capturing device to determine that other objects might be intended or desired to be captured. Accordingly, the input capturing device might identify an object attribute that represents, for example, a number of objects within a capture area, a number of objects (e.g., three objects) that might be intended or desired to be captured, a number of objects that might be intended to be captured that are entirely positioned within a capture area associated with an image, an indication that objects intended to be captured are entirely positioned within a capture area associated with an image, or the like. It can be appreciated that any tool, such as a distance detector and/or camera lens, can be used to identify or detect distance scene data.

As such, distance scene data can be used to verify that all portions of an object intended to be captured are included within a capture area. For example, upon detecting an object (e.g., a face), an image capturing device can identify a distance of other objects surrounding the original object (e.g., a face). In instances when the distance from the image capturing device to the original object varies from the distance from the image capturing device to the other objects surrounding the original object, it might be assumed that the entire original object (e.g., a face) is included within a capture area.

Visual scene data provides data associated with one or more objects included within a detectable area and/or capture area. A visual scene data might refer to a color, a size, a motion, a location, a brightness, a particularity, a feature, a characteristic, or the like of one or more objects. In one embodiment, a camera lens is utilized to detect or identify visual scene data.

In an alternative embodiment, object attributes are identified utilizing object preferences and scene data. In such a case, object preferences and scene data might be matched, analyzed, or compared relative to one another. By way of example only, an image capturing device might determine a distance from an image capturing device to one or more objects. For instance, a distance from an image capturing device to an object at or near the center of a capture area might be determined or calculated. Based on the determined distance, the input capturing device can identify other similar objects at approximately the same distance from the input capturing device to determine that other objects might be intended or desired to be captured. Upon determining that a specific number of objects might be intended or desired to be captured, the specific number of objects can be compared to an object preference to identify whether the preferred number of objects to be included within an image and the number of objects currently within the capture area match. Accordingly, the input capturing device might identify an object attribute that represents whether the preferred number of objects to be captured are positioned within a capture area (e.g., "yes" or "no").

At block 206, an indication of one or more object attributes (i.e., an object indicator) is provided. As such, in embodiments, an indication of an object attribute(s) is presented to a user. An object indicator might be visibly or audibly presented via the image capturing device. A visible presentation of an object indicator might utilize text, a light(s) (e.g., flashing, turned on, color change, etc.), a symbol(s), a message, a modification, a vibration, or the like. For example, assume that an identified object attribute represents two objects, such as faces, currently positioned within a capture area associated with an image. In such a case, the image capturing device might present an indication that two objects are within a capture area by providing the number "2," by providing two object icons (e.g., face icons), by flashing a light indicator twice to represent two faces, etc. In an embodiment where the indication indicates what might be captured if a capture area were to be adjusted (e.g., two faces are within the capture area and a third face is detected that could be within the capture area upon zooming out), an indication might be provided to a user in the form of two opaque face icons and one translucent face icon. In one embodiment, the visible presentation is presented on a face or portion of an image capturing device (e.g., the face having the lens) such that a user taking a self-portrait (i.e., a picture of himself or herself) can identify and recognize the indication of the object attribute.

By way of further example, assume that an identified object attribute represents an indication of whether each object (e.g., face) intended to be captured within an image is included within a corresponding capture area. In such a case, depending on whether each object intended to be captured is included within a capture area, an object indicator might be presented in a particular manner. For instance, a light may be turned on or presented as green if each desired object is entirely within a capture area. Alternatively, a "green" light might be displayed if each desired object is entirely within a capture area (e.g. including face and hair), a "yellow" light might be displayed if a portion of an object, such as an individual's hair, is not included within a capture area, and a "red" light might be displayed if a significant portion of an object, such as a portion of a face, is not included within a capture area.

One skilled in the art will appreciate that an object indicator might, in some embodiments, refer to a modification of one or more capture area parameters. In this regard, a capture area parameter might be automatically adjusted and, thereby, provide an indication of an object attribute. A capture area parameter refers to any parameter associated with a capture area. By way of example, and not limitation, a capture area parameter might include a size, dimension, focus, zoom, or the like associated with a capture area. As such, upon identifying one or more object attributes, one or more capture area parameters might be automatically (i.e., without user invention) adjusted such that the capture area sufficiently or appropriately corresponds with an image. In one embodiment, an image capturing device modifies a capture area parameter based on predetermined or established setting configurations associated with the image capturing device. In an alternative embodiment, an image capturing device modifies a capture area parameter based on user preferences, such as user-provided object preferences. For example, assume that an object preference refers to a preference to capture three faces within an image. In such a case, upon identifying that only two faces are located within a capture area, the image capturing device might modify a capture area parameter (e.g., move the capture area along an axis or zoom out) to accommodate three faces.

Alternatively or additionally, a capture area parameter might be automatically adjusted in association with the presentation of one or more other object indicators. For example, upon identifying an object attribute and presenting an object indicator in association therewith, a capture area parameter might be automatically modified in accordance with an object attribute or object preference. In some cases, rather than automatically modifying a capture area parameter, a user might be presented via a user interface with an option to modify one or more capture area parameters. Such an option might specify a modification or enable a user to select a specific modification of capture area parameters.

Figure 3:
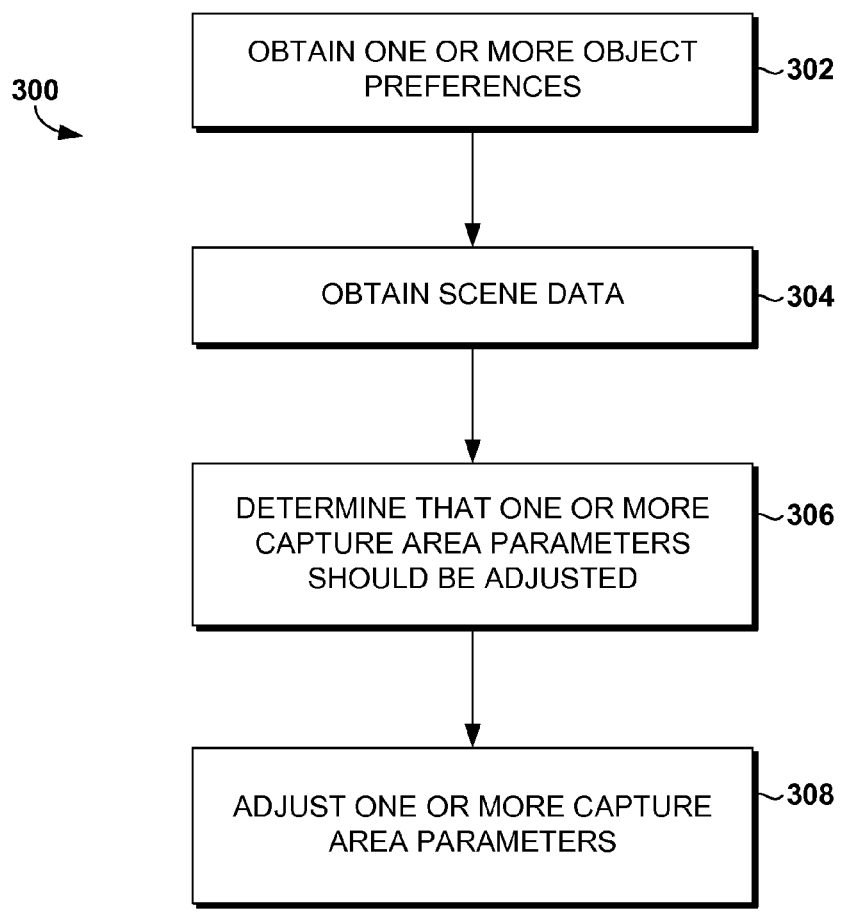
FIG. 3 is a flow diagram showing a method for adjusting a capture area associated with an image capturing device in accordance with an embodiment of the present invention.
Figure 4:
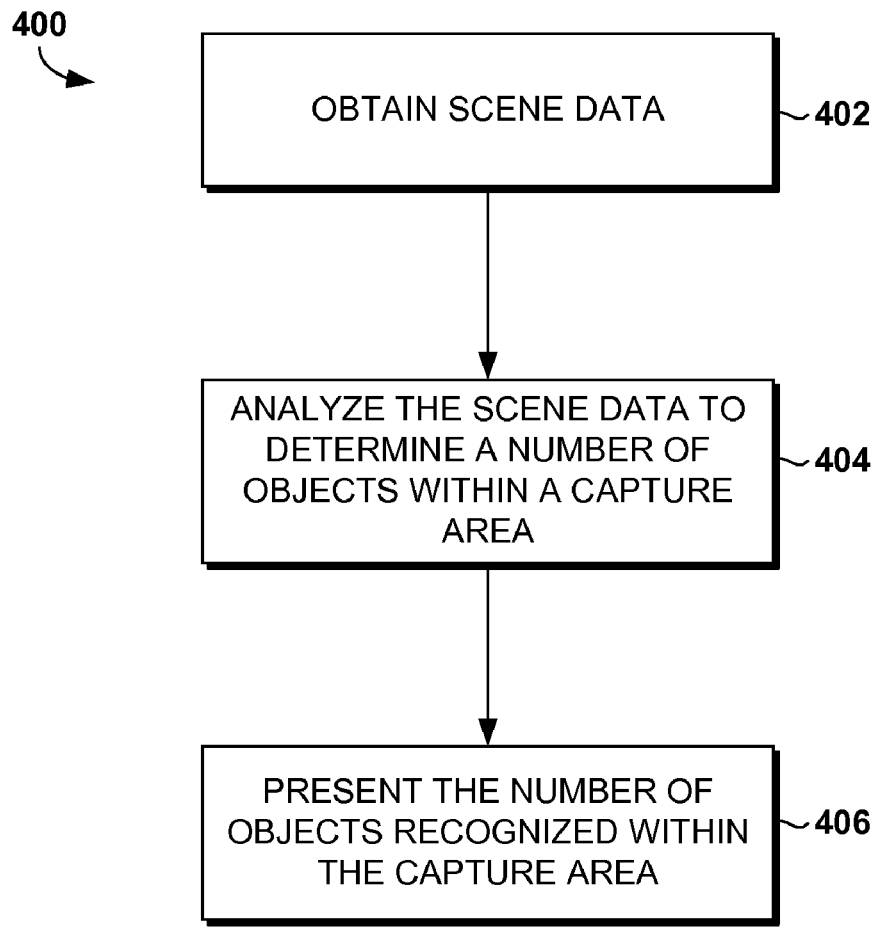
FIG. 4 is a flow diagram showing a method for providing an object attribute in accordance with an embodiment of the present invention.
Figure 5:
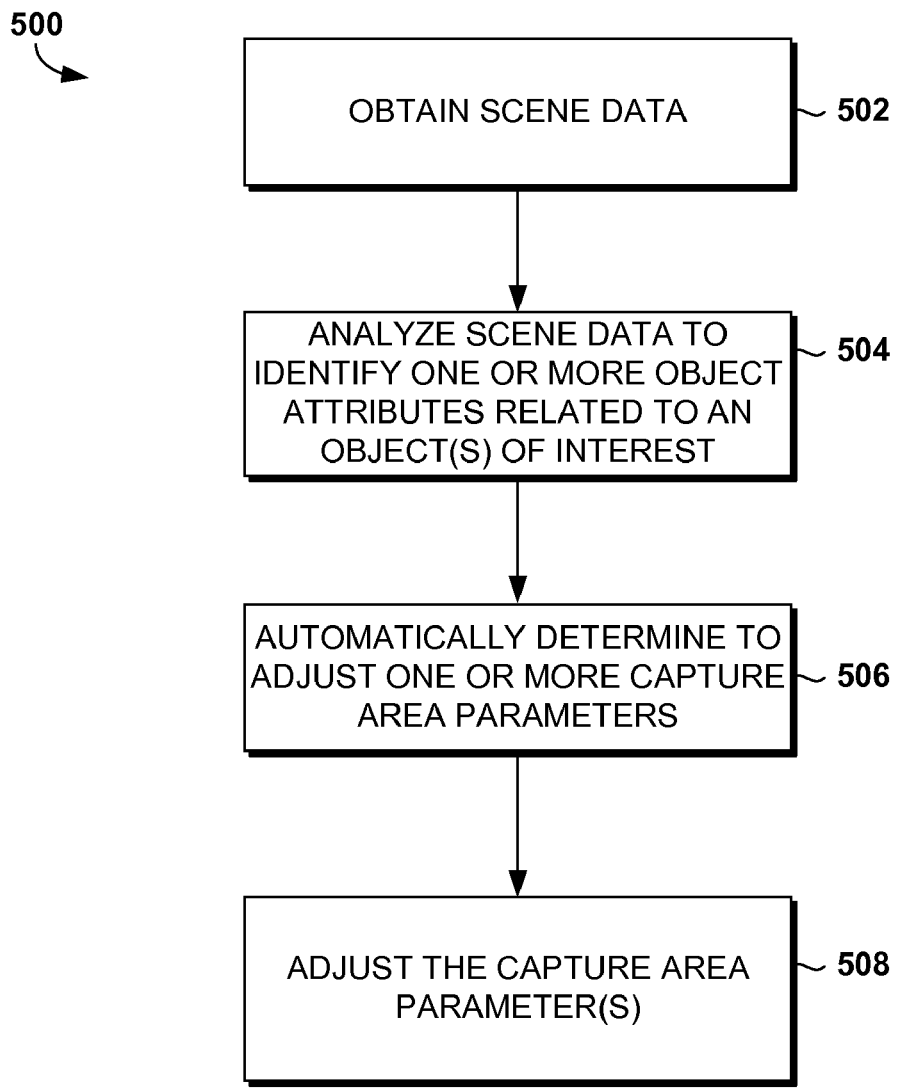
FIG. 5 is a flow diagram showing a further method for adjusting one or more capture area parameters in accordance with an embodiment of the present invention.

FIGS. 3-5 provide various exemplary methods for implementing embodiments of the present invention. With specific reference to FIG. 3, a flow diagram is provided that illustrates a method 300 for adjusting a capture area associated with an image capturing device. Initially, as shown at block 302, one or more object preferences are obtained. In embodiments, an object preference is received based on user input via a user interface. Such an object preference may indicate, for example, that the user wishes to take a picture of two people. At block 304, scene data is obtained. In embodiments, scene data is obtained using a distance detector and/or a camera lens. For instance, as discussed above, the camera may use a distance detector to obtain distance scene data relating to the detectable scene. Additionally or alternatively, the camera may obtain visual scene data relating to the detectable scene. In this regard, the camera can utilize the obtained distance scene data, the obtained visual scene data, or both to analyze the detectable scene. Based on the obtained object preferences and scene data, at block 306, it is determined that one or more capture area parameters should be adjusted. In embodiments, such a determination is made in accordance with one or more object attributes identified using the obtained object preferences and scene data. Subsequently, one or more capture area parameters are adjusted at block 308. Adjusting a capture area parameter can provide an indication of an object attribute to a user (e.g., not all desired objects are within the capture area). In one embodiment, capture area parameters are automatically adjusted upon a determination that capture area parameters should be adjusted. In another embodiment, a user interface is presented upon a determination that capture area parameters should be adjusted and, thereafter, based on user input, the capture area parameters are adjusted.

By way of example only, assume that a user inputs an object preference that the user wishes to take a photograph of two people. Further assume that an image capturing device obtains scene data, such as distance scene data and/or visual scene data, and recognizes that only one person is currently within a capture area. Based on the object preference that an image with two individuals is desired and the scene data indicating that only one individual is within the capture area, the image capturing device might determine that at least one capture area parameter should be adjusted to attain the object preference of two individuals. Accordingly, the image capturing device might zoom out such that the capture area is associated with a greater portion of the viewable scene.

It should be noted that these steps or blocks may be iteratively or otherwise repeated until satisfactory results are achieved. For example, after zooming out so that the capture area is associated with a greater portion of the viewable scene, perhaps only one person remains within the capture area. Blocks 306 and 308 may be repeated to achieve the desired result that two people be within the capture area. For example, new scene data may be received upon zooming out. It may then be determined, for example, that only one person is still within the capture area. The lens may be further zoomed out, and additional scene data might again be obtained. Thereafter, it might then be determined that two individuals not exist within the capture area. At this point, the process may end as the desired result has been achieved (i.e., two people are included within the capture area, as indicated by the user input).

Turning now to FIG. 4, a flow diagram is provided that illustrates a method 400 for providing an object attribute, in accordance with the present invention. Initially, as indicated at block 402, scene data is obtained. At block 404, the scene data is analyzed to determine a number of objects (e.g., faces) within a capture area. For example, a face-detection algorithm may be utilized to determine that two faces are within the capture area. Subsequently, at block 406, the number of objects recognized within the capture area may then be presented to a user. One skilled in the art will appreciate that method 400 can be performed in association with one or more other object attributes.

By way of example only, an image capturing device may be held out from a user to take a picture of the user and another person. The image capturing device might receive scene data and, thereafter, analyze the scene data to determine that one face is within the capture area. An indication of "one face" within the capture area may be provided to the user. For instance, the image capturing device might present the number "1" and/or a face icon, indicating that one face is detected to be within the capture area. It should be noted that the method illustrated in FIG. 4 may be combined with other implementations. For example, assume that the user is not satisfied with a single individual being included within the capture area, as the user intended to take a picture of the user and another person. Accordingly, the user may then, for example, provide input that a picture of two people is desired. Scene data may again be received and analyzed to determine that only one face is within the capture area. The camera lens may then be zoomed out. Scene data may again be received and analyzed to determine that two faces are now within the capture area. The image capturing device might then present the number "2" and a face icon, indicating that two faces are now within the capture area. The user may be satisfied with such an indication and elect to take a picture (or allow the camera to automatically take a picture).

Turning now to FIG. 5, a flow diagram is provided that shows a further method 500 for adjusting one or more capture area parameters in accordance with an embodiment of the present invention. Initially, as indicated at block 502, scene data is obtained. As noted above, such scene data may include distance scene data, visual scene data, or other data relating to the detectable area. Thereafter, at block 504, the obtained scene data is analyzed to identify one or more object attributes related to an object(s) of interest. Based on the identified object attribute(s), it is automatically determined to adjust one or more capture area parameters. This is indicated at block 506. At block 508, the capture area parameter(s) are adjusted, for example, by zooming out, zooming in, panning in a particular direct, etc.

With reference to FIGS. 6-10, FIGS. 6-10 illustrate specific examples of various embodiments of the present application. Turning initially to FIG. 6A, diagram 600 illustrates viewable scene 606, detectable area 602, and capture area 604. Generally, viewable scene 606 includes anything capable of being visually detected from a particular vantage point. Detectable area 602 includes anything that is within viewable scene 606 and detectable by the image capturing device when in a fixed position. Capture area 604 includes anything within visual scene 606 that may be captured as an image or image data by the image capturing device.

For example, in diagram 600, a camera may be placed on a tripod at a particular location. From that particular location, viewable scene 606 may be viewed. It should again be noted that it is not necessarily that all aspects of viewable scene 606 may be viewed through the camera lens at a particular instance. Rather, viewable scene 606 includes an area, and objects therein, that is capable of being viewed from a particular vantage point. So, for example, while a camera may be facing north and viewing person 608 and house 610, there may be objects within viewable scene 606 to the east that are not currently within view of the camera, such as car 612. Any such objects, such as car 612, are nevertheless within viewable scene 606 because they could be viewed from the same vantage point after rotation. Viewable scene 606 is thus illustrated as anything capable of being viewed from a particular vantage point. In the above example, rotating the camera 180 degrees so that it is more east-facing would allow other objects, such as car 612, to be viewed from the vantage point of the tripod.

Within viewable scene 606 is detectable area 602. Detectable area refers to the area within viewable scene 606 that an image capturing device is capable of detecting when the device is maintained in a fixed position. For example, a camera may be mounted to a tripod and facing north. The camera may have a distance detector capable of detecting objects on the front side of the camera. As such, objects detectable via the camera by the distance detector are within detectable area 602. Capture area 604 is the portion of viewable scene 606 that would be captured as an image or image data should a picture be taken with the current arrangement. For example, in FIG. 6A, the image captured with the current arrangements would be the portion of viewable scene 606 within capture area 604 including a portion of person 608 and house 610.

Figure 6A:
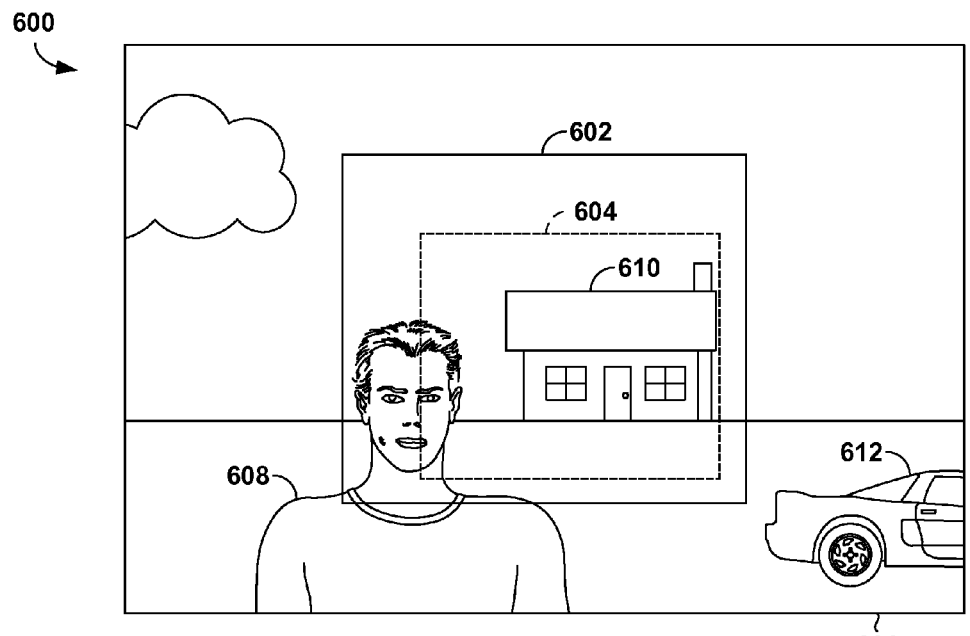
FIG. 6A is an exemplary diagram showing a first embodiment of the present invention.
Figure 6B:
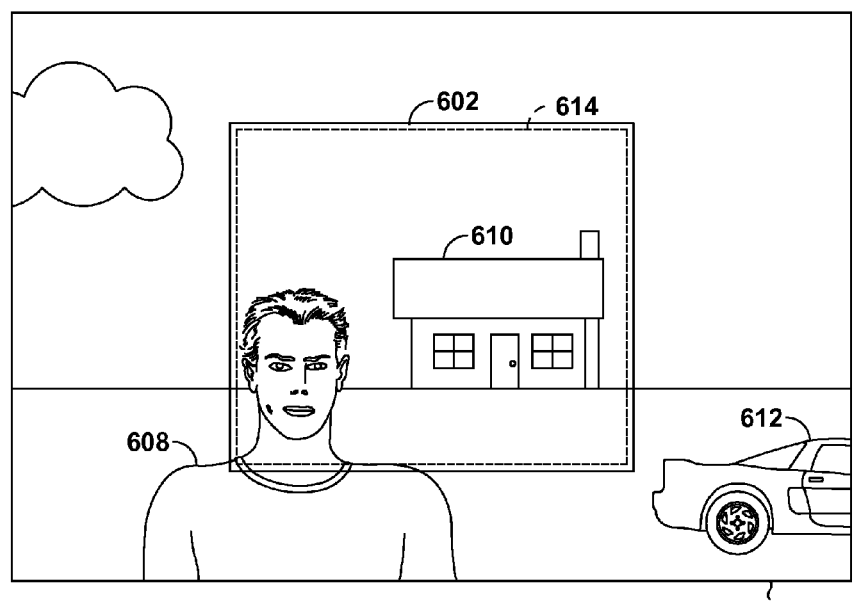
FIG. 6B is another exemplary diagram showing a first embodiment of the present invention.

In accordance with embodiments of the present invention, the image input device may analyze scene data associated with detectable area 602 to determine that a portion of person 608 is not currently within capture area 604, as illustrated by FIG. 6A. In response to this determination, the camera may automatically zoom out the lens, such that the capture area 614 includes a larger portion of person 608, as illustrated by FIG. 6B. It should be noted that this analysis can be accomplished in a number of ways including utilizing edge-detection algorithms, distance measurements, color similarities between the portions of detectable area 602 that are within capture area 604 and portions of detectable area 602 that are not within capture area 604, etc. It will be appreciated by one of ordinary skill in the art that there are a number of ways to detect that portions of an object lie within capture area 604 and portions of an object lie outside of capture area 604.

Figure 7A:
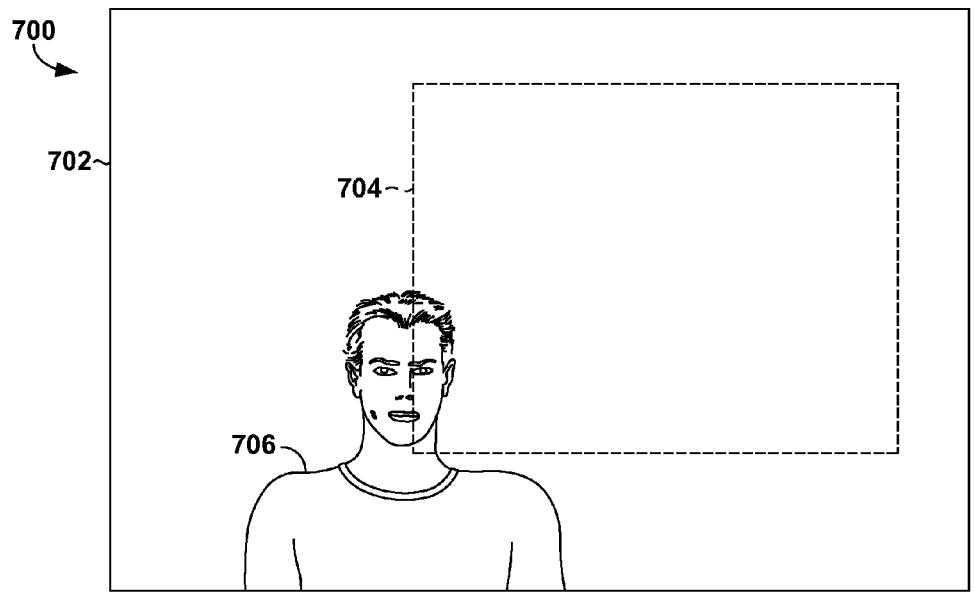
FIG. 7A is an exemplary diagram showing a second embodiment of the present invention.
Figure 7B:
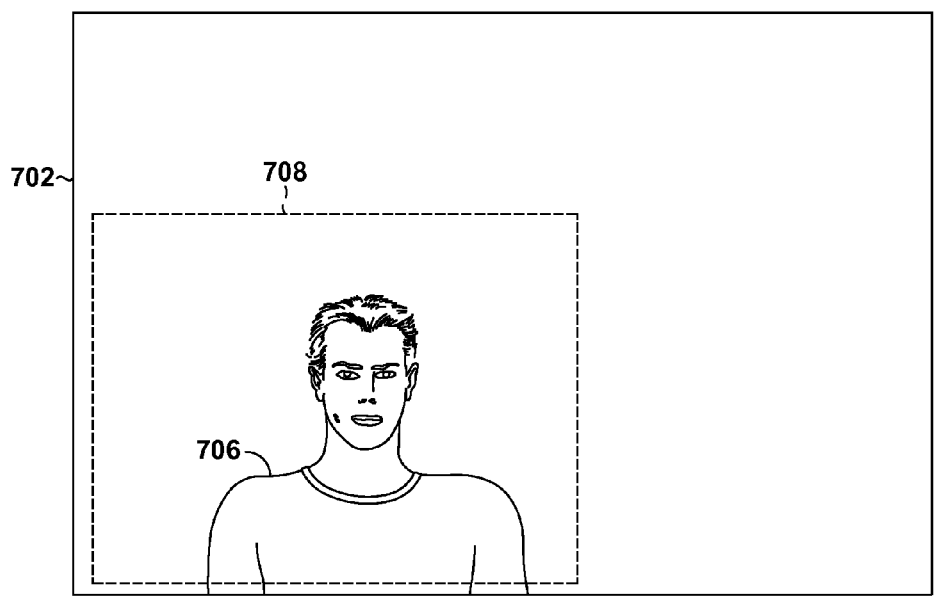
FIG. 7B is another exemplary diagram showing a second embodiment of the present invention.

Referring now to FIG. 7A, diagram 700 illustrates detectable area 702 and capture area 704. Upon determining that a person 706 is only partially within capture area 704, the image capturing device may pan the capture area down and to the left such that a greater portion of person 706 is within the capture area 708, as shown in FIG. 7B. For instance, assume that a user is taking a self portrait by holding a camera out from his body with the lens facing himself. Perhaps the user also input into camera that a picture of a single face is desired. The user, incapable of looking through the viewfinder while taking an image, cannot determine whether the capture area is oriented correctly. The camera in accordance with embodiments of the present invention may, however, upon examining the capture area and the detectable area, determine that the face of user is not fully within capture area. The camera may determine this in a number of ways, including face-detection algorithms (including comparing a picture of the user that has been previously stored on the camera with the face of the user that is within detectable area). Upon determining that the face of user is not fully within the capture area, the camera can automatically adjust a capturing area parameter (e.g., pan the capture area to the left and down such that the face of user is fully within capture area or zoom out). Alternatively, the camera can provide the user with an indication that the face of the user is not fully within the capture area such that the user can manually adjust a capture area parameter (e.g., move the camera).

Figure 8A:
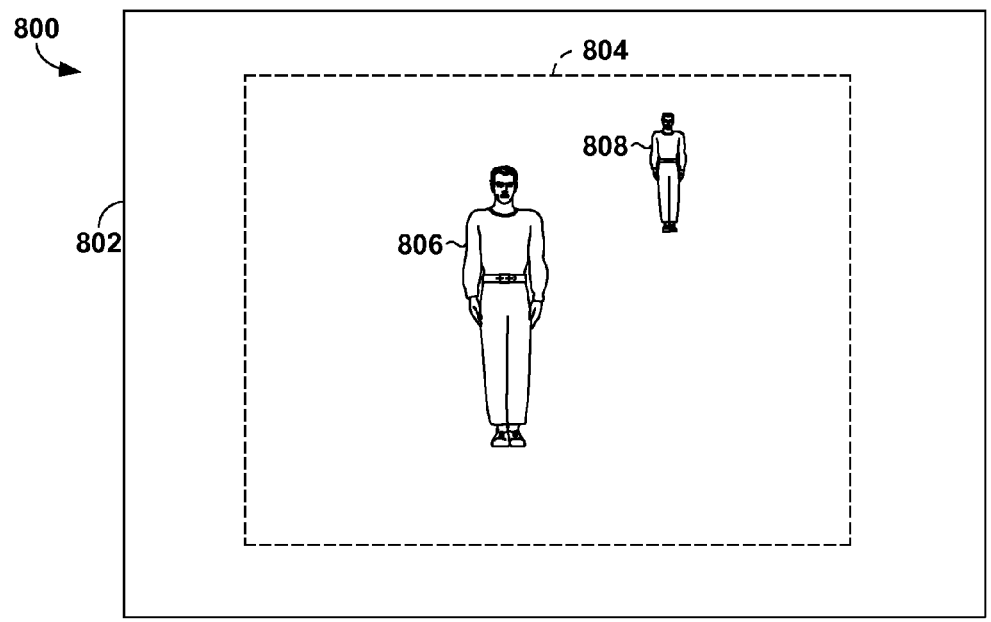
FIG. 8A is an exemplary diagram showing a third embodiment of the present invention.
Figure 8B:
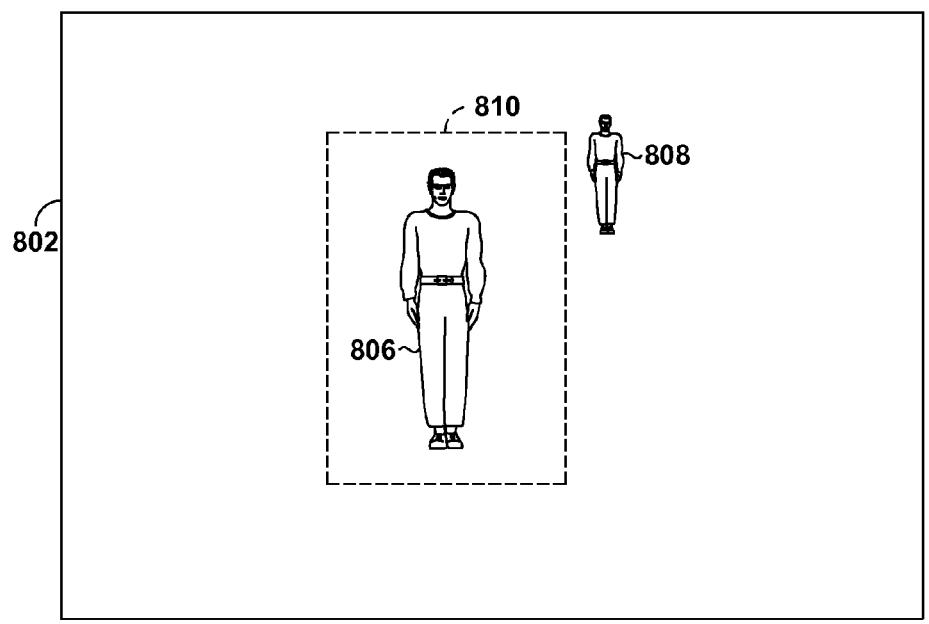
FIG. 8B is another exemplary diagram showing a third embodiment of the present invention.

In another example of an embodiment in accordance with the present invention, FIG. 8A illustrates a detectable area 802, a capture area 804, and a person 806. In this example, the person 806 is fully within the capture area 804, but occupies a smaller portion of capture area 804 than may be desired. The image capturing device may automatically determine that the person occupies a smaller portion of the capture area, for example, by determining that the person 806 is an object of interest. The image capturing device might determine objects of interest by noting objects in the center of a detectable area, such as detectable area 802. An algorithm can be utilized to determine that person 806 occupies only approximately 20% of capture area 804. Image capturing device may also detect the distance the person 806 is from the image capturing device. Based on the distance the person 806 of interest is from the image capturing device and the distance a bystander 808 is from the image capturing device, the image capturing device may determine that the bystander 808 is not to be included in capture area 804 because the bystander 808 is not a similar distance from the image capturing device as the person 806 of interest. Upon making such a determination, the image capturing device may automatically modify capture area 804, perhaps by zooming in, such that the person 806 occupies a larger portion (e.g., approximately 80%) of the capture area 810 and bystander 808 is not included within the capture area 810, as illustrated in FIG. 8B.

Figure 9A:
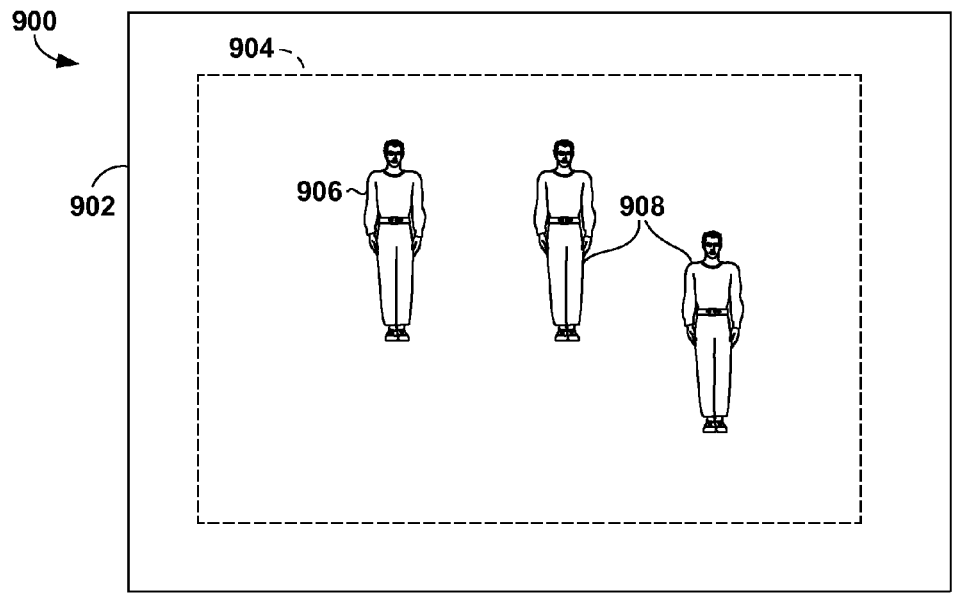
FIG. 9A is an exemplary diagram showing a fourth embodiment of the present invention.
Figure 9B:
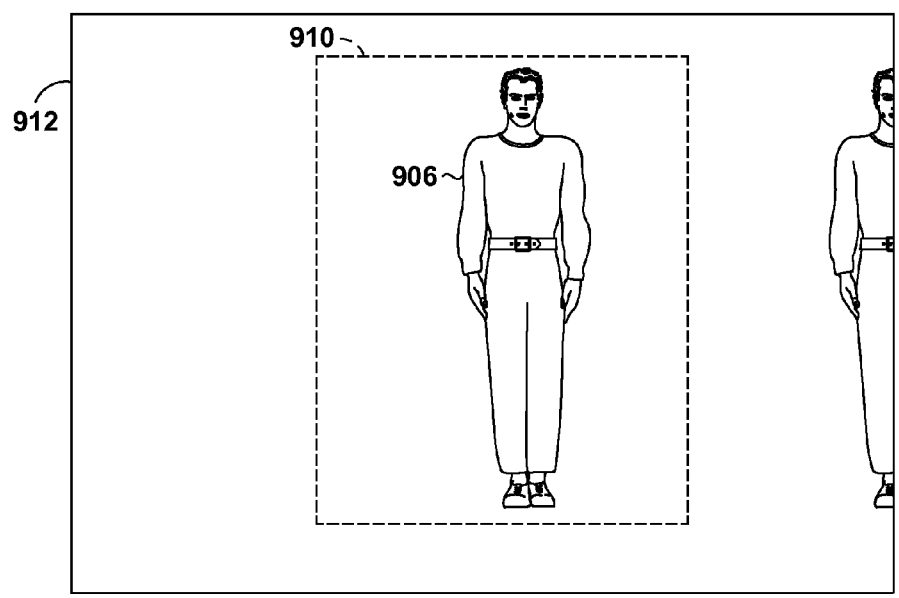
FIG. 9B is another exemplary diagram showing a fourth embodiment of the present invention.

In another example of an embodiment in accordance with the present invention, FIG. 9A illustrates a detectable area 902, a capture area 904, and a person 906. In this example, the person 906 is again fully within the capture area 904, but occupies a smaller portion of the capture area 904 than may be desired. Based on an indication to provide object attributes, including an automatic modification of a capture area parameter, the image capturing device might determine that the person 906 occupies a smaller portion of the capture area 904 than may be desired, for example, by determining that the person 906 is an object of interest. In embodiments, the image capturing device may make such a determination by detecting the face of the person 906 and comparing this face to a face stored in association with the image capturing device. Alternatively, the person 906 may have input that a self-portrait is desired. The image capturing device may then utilize an algorithm to determine that the person 906 occupies only approximately 10% of the capture area 904, and that there are two bystanders 908 within the capture area 904. Upon making such a determination, the image capturing device may automatically modify capture area 904 by zooming in, such that person 906 occupies a larger portion of capture area 910, as illustrated in FIG. 9B. Alternatively, the image capturing device might provide a user of the device with an indication that three individuals are within the capture area 904 such that the user can manually adjust a capture area parameter (e.g., pan or zoom in) to attain a self-portrait. It should be noted that, in the above example, detectable area 912 is modified along with capture area 910, as illustrated by FIG. 9B. This may be because the detectable area 912 includes the area as viewed through a lens. Thus, upon zooming in, detectable area 912 is modified along with capture area 910.

Figure 10A:
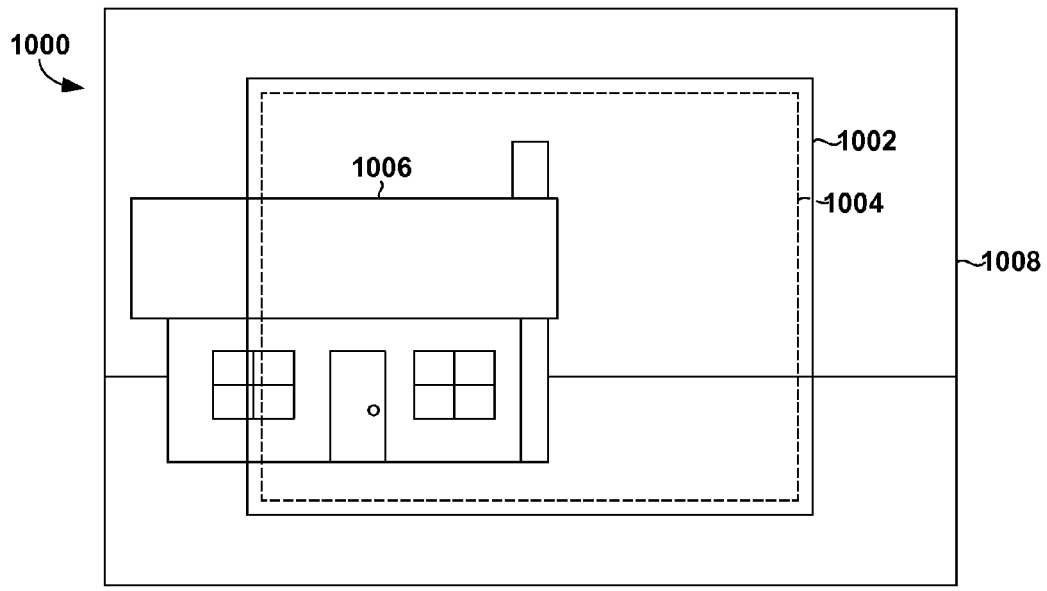
FIG. 10A is an exemplary diagram showing a fifth embodiment of the present invention.

In yet another example of an embodiment in accordance with the present invention, FIG. 10A illustrates a detectable area 1002, a capture area 1004, and an object of interest 1006. In this example, the object of interest 1006 is only partially within the capture area 1004. It should be noted that this may be detected even though a portion of the object of interest lies outside of detectable area 1002. Accordingly, in embodiments, an indication is presented via an image capturing device that the object of interest 1006 is partially within the capture area. The object of interest 1006, however, may become within the capture area following a modification of a capture area parameter. In this regard, a modification of a capture area parameter may be made by a user or automatically provided.

Figure 10B:
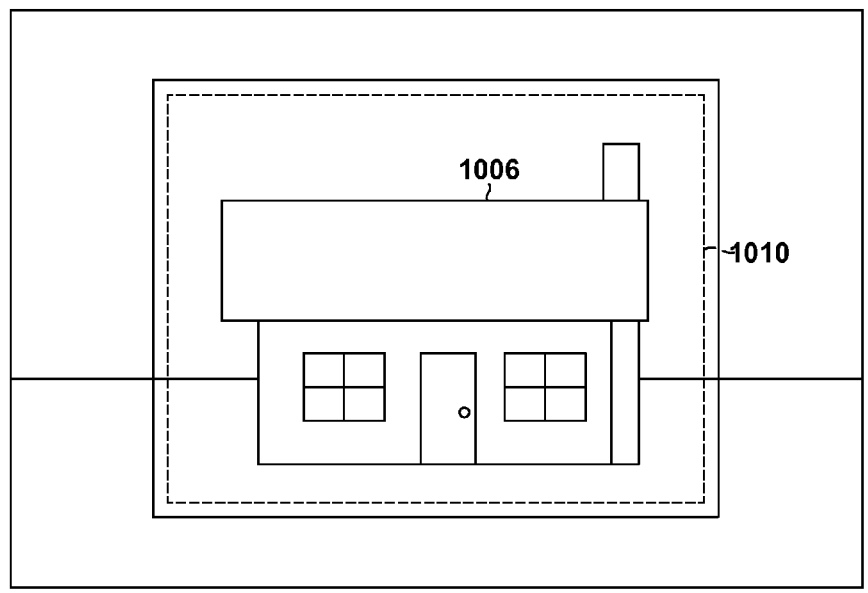
FIG. 10B is another exemplary diagram showing a fifth embodiment of the present invention.

For example, perhaps a user placed a camera on a motorized tripod such that the detectable area 1002 and the capture area 1004 contain a portion of the object of interest 1006. The camera may detect that it is likely that a portion of the object of interest 1006 lies outside of the capture area 704 because, through the use of edge-detection, the boundaries of the object of interest 1006 extend to the edge of the detectable area 1002. A signal may then be sent to the motorized tripod to rotate the camera to the left such that the object of interest 1006 may come fully within the capture area 1010, as illustrated by FIG. 10B.

Many different arrangements of the various components depicted, as well as components not shown, are possible without departing from the scope of the claims below.

Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for providing indications of object attributes to users via image capturing devices, the method comprising:
    obtaining scene data associated with a detectable area;
    utilizing the scene data to identify an object attribute associated with a set of one or more objects within the detectable area; and
    providing an indication of the object attribute via an image capturing device, wherein the indication of the object attribute comprises a presentation of an option to modify one or more capture area parameters.

2. The method of claim 1, wherein the scene data comprises visual scene data, distance scene data, or a combination thereof.

3. The method of claim 1, wherein the scene data is obtained upon receiving an indication from a user to provide the object attribute.

4. The method of claim 1 further comprising:
    obtaining an object preference that indicates one or more object attributes desired or intended to be captured within an image; and
    using the object preference and the scene data to identify the object attribute.

5. The method of claim 1, wherein the object attribute comprises a number of objects within an image, a number of objects excluded from an image, whether a specific object is within an image, whether a specific number of objects is within an image, whether a particular object preference is within an image, whether a type of object is within an image, or a combination thereof.

6. The method of claim 1, wherein the indication of the object attribute comprises a visual indication, an audio indication, or a combination thereof.

7. The method of claim 1, wherein the indication of the object attribute comprises an automatic modification of one or more capture area parameters.

8. The method of claim 1 further comprising receiving a user selection to modify the one or more capture area parameters.

9. One or more non-transitory computer-readable media having computer-executable instructions embodied thereon that, when executed, perform a method for providing feedback to a user of an image capturing device, the method comprising:
    obtaining scene data, at least a portion of the scene data being associated with a capture area;
    analyzing the obtained scene data to determine a number of objects within the capture area; and
    providing to the user via the image capturing device an indication of the number of objects within the capture area.

10. The media of claim 9, wherein the user is provided with a number to indicate the number of objects within the capture area.

11. The media of claim 9, wherein the user is provided with one or more number of icons, the one or more icons indicating the number of objects within the capture area.

12. The media of claim 9, wherein a portion of an object is determined to be within the capture area.

13. The media of claim 12, wherein the indication of the number of objects includes an indication that the portion of the object is within the capture area.

14. The media of claim 9, wherein the scene data input comprises distance data of the image capturing device in relation to one or more objects within the capture area.

15. The media of claim 9, wherein the scene data comprises visual data in association with the capture area.

16. The media of claim 9, wherein the number of objects within the capture area includes the number of objects within the capture area that are intended to be within the capture area.

17. One or more non-transitory computer-readable media having computer-executable instructions embodied thereon that, when executed, perform a method for providing feedback to a user of an image capturing device, the method comprising:
    using distance scene data to determine one or more objects intended to be captured in an image, wherein the distance scene data comprises one or more distances from the image capturing device to one or more objects within a detectable area corresponding with the image capturing device;
    identifying that each of the one or more objects intended to be captured are not entirely within a capture area; and
    providing an indication to the user that at least one of the one or more objects intended to be captured are not entirely within the capture area.

18. The media of claim 17, wherein the indication comprises a light, a vibration, text, an icon, a symbol, or a combination thereof.

19. The media of claim 17, wherein the indication comprises an automatic modification of one or more capture area parameters.

* * * * *